April 1, 1941.   G. A. HUGHES   2,236,823
MULTIPLE WELDER
Filed May 16, 1939   3 Sheets-Sheet 1

Inventor
Grover A. Hughes,
By Wilkinson & Groff
Attorneys

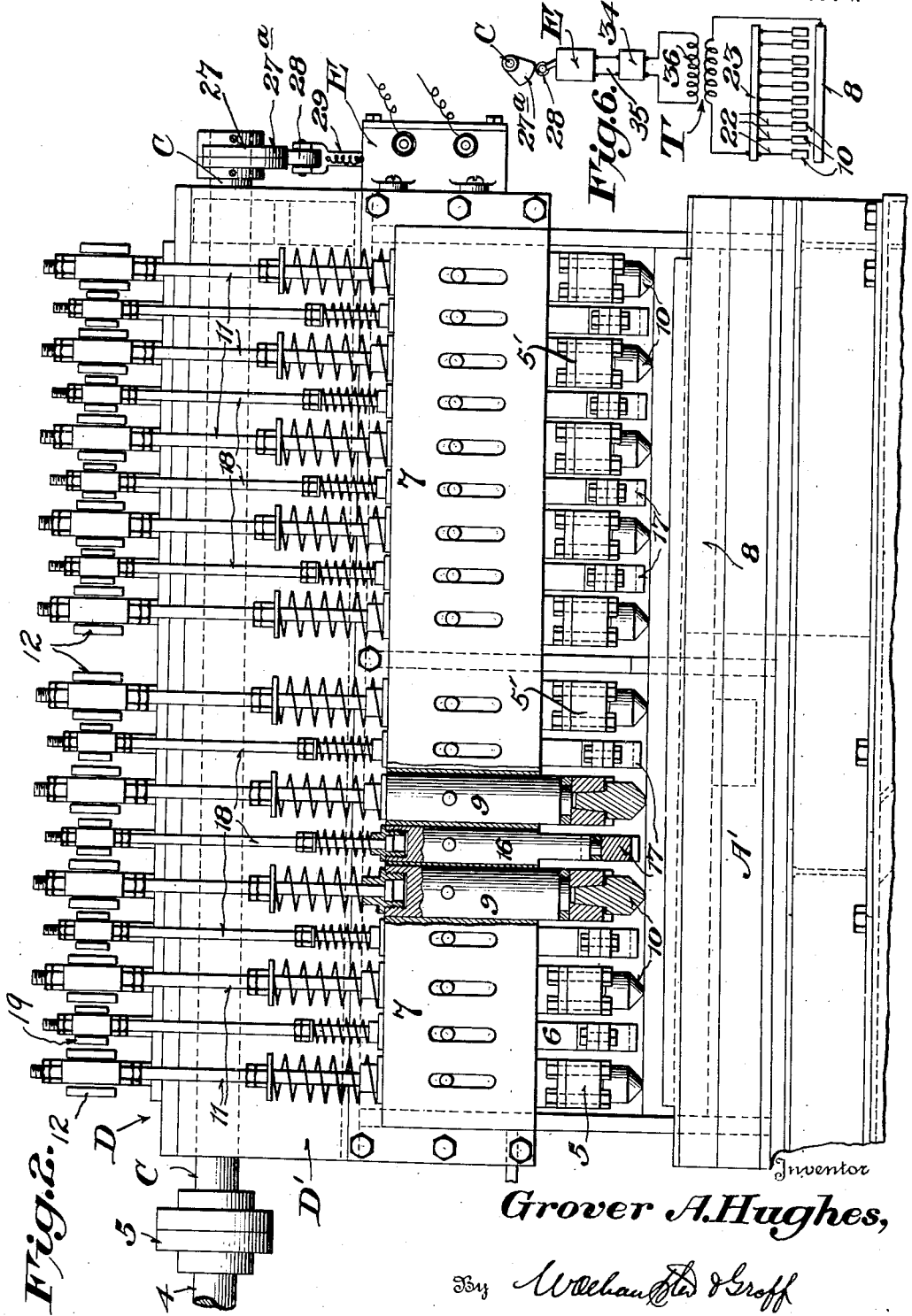

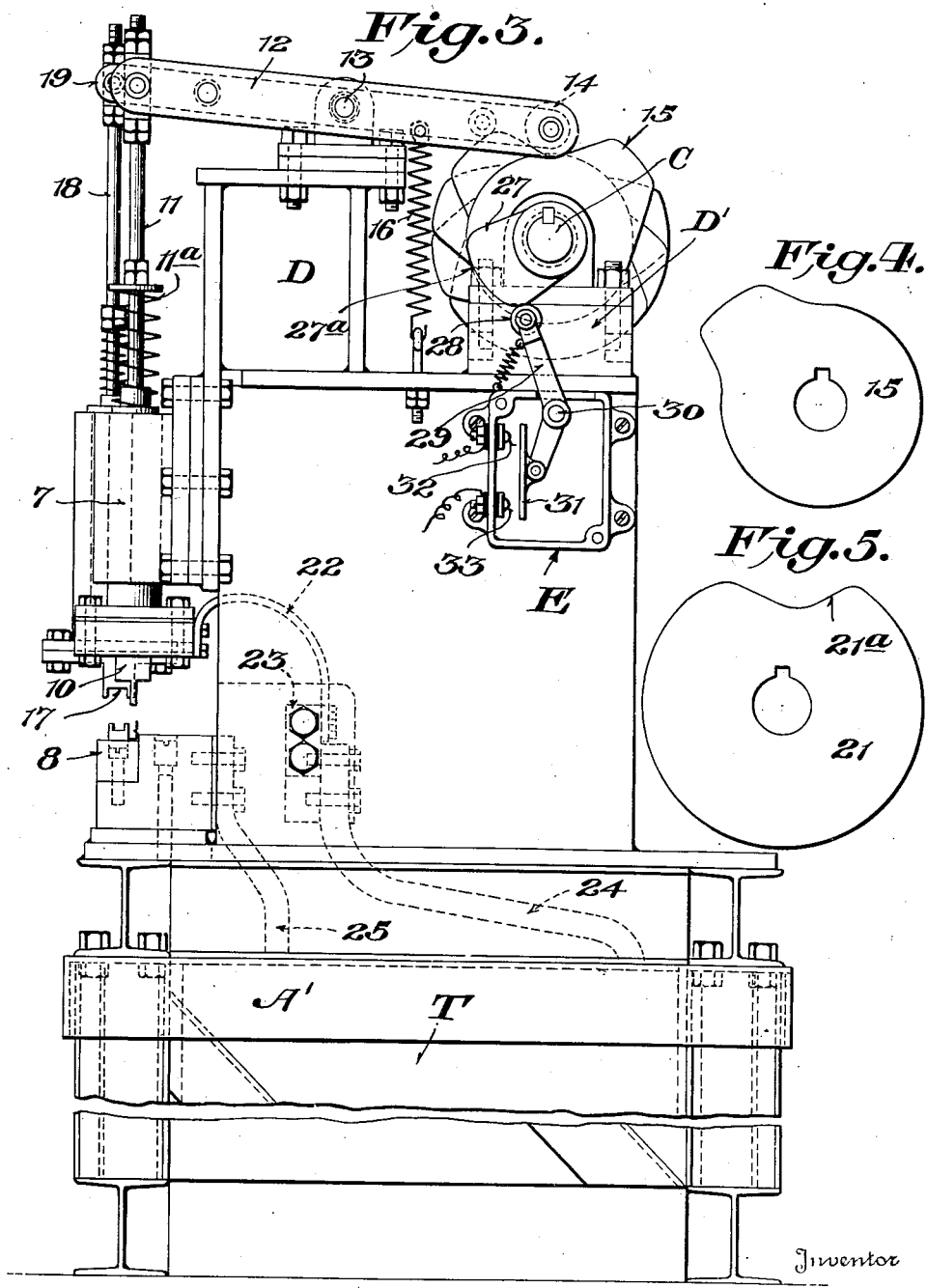

Patented Apr. 1, 1941

2,236,823

UNITED STATES PATENT OFFICE 2,236,823

MULTIPLE WELDER

Grover A. Hughes, Youngstown, Ohio, assignor to Truscon Steel Company, Youngstown, Ohio, a corporation of Michigan Application May 16, 1939, Serial No. 274,053

3 Claims. (Cl. 219—4)

This invention relates to welding apparatus and has particular reference to a machine for successively and progressively spot welding metallic parts together.

A primary object of the invention is to provide an apparatus wherein a plurality of welding instrumentalities utilize the secondary current of the transformer to effect progressive welding without interrupting the primary circuit. That is to say, the invention contemplates an apparatus wherein a plurality of movable electrodes successively engage one of the parts to be welded to effect a plurality of uniform welds upon a single closing of the primary circuit of the transformer thereby utilizing the full current capacity of the transformer secondary at each point of welding.

A further object of the invention is to provide an apparatus for conveniently and expeditiously handling the parts to be welded, such, for example, as the frame parts of double hung windows, and including in its organization, means for holding the parts in assembled relation which operates synchronously with the electrodes as they progressively contact one part of the work superimposed on the other part resting on a stationary electrode. In that connection, it is a distinctive feature of the invention that the work engaging means operates to hold the parts rigidly assembled while the electrodes successively come into play to form the welds, the said electrodes being timed so that as between adjacent electrode tips there is an interval or brief period of time in which adjacent electrodes are both in contact with the work, thereby preserving the continuity of the welding circuit.

With the above and other objects in view which will more readily appear as the nature of the invention is better understood, the same consists in the novel construction, combination, and arrangements of parts hereinafter more fully described, illustrated and claimed.

A preferred and practical embodiment of the invention is shown in the accompanying drawings, in which:

Figure 2 is a front elevation of the complete welding unit.

Figure 3 is an end elevation of the apparatus shown in Figures 1 and 2 looking at the circuit controlling end as distinguished from the power end.

Figure 4 is a detail view of one of the electrode controlling cams.

Figure 5 is a detail view of one of the hold down cams.

Figure 6 is a diagrammatic view of the transformer circuit.

Similar reference characters designate corresponding parts throughout the several figures of the drawings.

Figure 1:
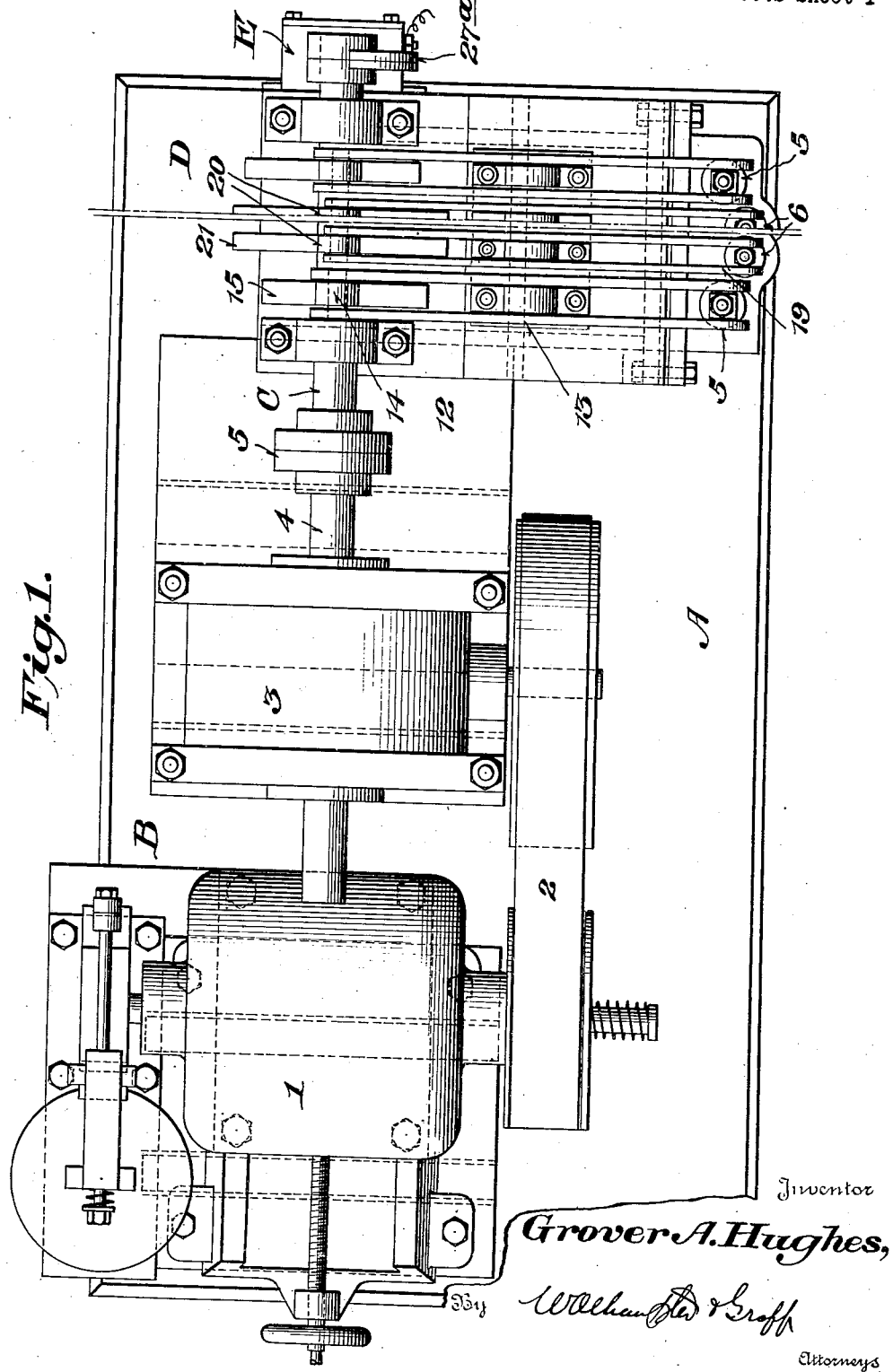
Figure 1 is a top plan view of the improved apparatus, the same being partly broken away at the location of the welding unit to visualize the general lay-out.

Referring to Figure 1, the invention includes in its organization a base or frame designated generally as A. One end of the said frame supports the power means, designated generally as B, for operating a cam shaft C which controls the functions of the welding unit designated generally as D. One end of the cam shaft C is provided with a cam for operating a conventional limit switch E which controls a standard magnetic contactor for closing the circuit from the transformer T to the welding unit. The said transformer T is supported beneath the welding unit at the location A' in Figure 3.

The power unit B comprises a motor 1 having a driving connection 2 with suitable speed reducing gearing 3 for operating the shaft 4. This shaft is connected by a coupling 5 with the cam shaft C of the welding unit. As will presently appear, the said cam shaft carries a plurality of cams for respectively controlling the movable electrodes and other cams for holding the work in position while the welding operation proceeds.

The welding unit D, as may best be observed from Figs. 2 and 3, includes suitable framework D' in which the shaft C is journaled. The said shaft occupying the position substantially to the rear of the framework. A plurality of movable electrodes 5' and hold-down plungers 6 are mounted for vertical sliding movement in a suitable guide block 7 located at the front of the machine. The electrodes 5' are intended to co-operate with a stationary electrode 8 carried by the upper part of the frame portion A', and, as will be observed from Figures 1 and 2, the movable electrode units 5' are linearly alined while the hold-down plungers 6 are also arranged in suitable alinement but to one side of the electrodes so that the hold-down means will be properly positioned to engage the work while it is being operated on by the electrodes 5'. All of the movable electrodes 5' are alike, and the same is true of all of the hold-down plungers 6. Therefore, a description of each one of these instrumentalities and their associated parts will suffice for the others.

Referring first to the movable electrode units

5' it may be pointed out, by reference to Figure 2, that the same includes a guide portion 9 having a welding tip 10 at its lower end while its upper end is recessed to receive the headed extremity of a connecting rod 11. The upper end of this rod is pivoted to a lever arm 12 rockably supported as at 13 (Fig. 3) in the framework of the welding unit, the said lever or rocker arm having a roller 14 at its rear end adapted to engage with a cam 15 on the cam shaft C. A spring 16 is connected with the rocker arm 12 between the pivot 13 and the roller 14 for the purpose of maintaining the latter against the periphery of the cam 15. It may be pointed out also that the connecting rod 11 is provided with a spring 11a confined between a washer on the rod and the upper end of the guide 9 thereby to maintain said guide normally in its lowered position with reference to the end of the connecting rod. The purpose of the head on the rod operating in the recess on the upper end of the guide portion is to operate in conjunction with the spring 11a to permit the electrode tips to be yieldingly pressed into engagement with the work when the electrode is lowered by the cam.

The hold-down plungers 6 also include a guide portion 16 slidably mounted in the guide block 7, and the lower end of said guide 16 may be fitted with any suitable form of work engaging clip or foot 17. The upper end of the guide 16 is yieldingly connected with the rod 18 which in turn is pivotally connected with a rocker arm 19. This rocker arm is pivotally mounted co-axially with the pivot 13 of the rocker arm 12 and is provided with a roller 20 for engaging with its related hold-down cam 21.

It will, of course, be understood that the welding tips 10 as well as the work engaging clips 17 are detachably connected with their respective guide members so that different forms and types of tips and clips may be used acording to the type of work being performed by the machine. In connection with the movable electrodes 5', it will be observed from Figure 3 that the clamping means which holds the clips 17 in position also constitutes a terminal for a flexible conductor 22. A separate conductor is provided for each of the movable electrodes.

All of the conductors for the said movable electrodes are connected to a common buss bar 23 suitably mounted in and insulated from the frame of the machine. The said bar 23 is in turn connected with the secondary of the transformer T by a conductor 24 and the stationary electrode 8 is connected with the said secondary by a conductor 25.

From the description of the movable electrodes and the hold-down plungers it will be apparent that any desired number of these plungers may be employed according to the predetermined capacity of the machine as to the length of parts intended to be welded together. In the present apparatus eight hold-down plungers are employed, and ten movable electrodes are used. Accordingly, there will be ten electrode controlling cams 15 and eight cams 21 for controlling the hold-down plungers. The cams 15 for controlling the electrodes are positioned along the cam shaft C in spaced angular relation, 30° apart, and the maximum dwell of the cam is so designed that there is approximately a five degree overlap in the contact period between adjacent movable electrodes. That is, one electrode will be held in contact with the work for a duration of approximately five degrees in the travel of the cam which controls the next electrode, thereby maintaining the circuit closed as the several cams progressively engage the work, and eliminating arcing as each electrode tip withdraws from the work.

The cams 21 for operating the hold-down plungers are provided with a single peripheral depression 21a. These cams are spaced along the cam shaft C at the location of each of the rocker arms 19 which operate the hold-down plungers 6. All of these cams have the same angular setting on the cam shaft C and the peripheral depressions 21a all coincide so that all of the hold-down plungers 16 will rise and fall in unison. Thus, the cams 21 operate simultaneously to hold the plungers 6 in engagement with a portion of the work while the electrodes 5' are successively lowering and raising to form the welds.

The valley 21a of the cam 21 extends over approximately 55° of the cam surface so that the dwell of the cam is approximately 305°. Since the electrodes are ten in number and are spaced approximately 30° apart, it will be apparent that while the cam shaft C is moving through an arc of approximately 300°, all of the welding operations will take place, while, at the same time, the cam shaft in simultaneously moving through an arc of approximately 305° will hold down the work engaging plungers 16 and the clips 17. The operation of the hold-down means, therefore, precedes the operation of the electrodes and on the other hand the operation of all of the electrodes is completed before the hold down means releases. Moreover, as previously indicated, it will be understood that each electrode, after it is lowered into engagement with the work, will remain lowered for a brief interval after the next succeeding electrode has been lowered, before it starts to lift, thus maintaining the continuity of the secondary circuit during the welding operation.

The cam shaft C is also utilized for controlling the welding circuit as previously indicated through the medium of the time limit switch E. That is to say, the end of the cam shaft C opposite the coupling 5 is provided with a cam 27 which is preferably of the so-called butterfly or adjustable type, consisting of two plates, one of which may be angularly adjusted relative to the other, thereby to provide a greater or less peripheral surface 27a for engaging with the roller 28 of a spring tensioned switch arm 29. This arm is pivotally mounted as at 30 and carries a circuit closer 31 adapted to bridge the terminals 32 and 33 which are coupled with a suitable magnetic contactor 34 included in a circuit 35. The magnetic relay 34 is adapted to close the primary circuit 36 of the transformer T and thus supply secondary current respectively to the buss bar 23 through the lead 24 and to the stationary electrode 8 through the lead 25. The switch device E is a conventional time limit switch controlling a standard magnetic contactor, which closes the circuit after the first electrode is down and breaks it before the last electrode is lifted, and is, therefore, merely diagrammatically illustrated in connection with the present apparatus.

From the foregoing it will be apparent that a distinctive feature of the present invention resides in providing a plurality of movable electrodes connected with the transformer secondary and which are successively and progressively lowered to engage with one of the parts to be welded, while the primary circuit remains closed. The stationary electrode, which, of course, is common to all of the movable electrodes, provides the support for the work to be welded.

I claim:

1. In an apparatus for progressively forming spaced electrical welds while maintaining uninterrupted flow of current in the primary and secondary of the transformer supplying current for the welds, the combination including, a stationary electrode and work support, a plurality of alternately arranged movable electrodes and movable work engaging plungers, said electrodes being electrically connected with the secondary of the transformer, a single power driven shaft, means controlled by said shaft substantially at the beginning and end of each cycle for closing and opening the electric circuit to the transformer, a plurality of means also controlled by the shaft during the intermediate stage of the cycle of said shaft for successively lowering the plungers simultaneously into work engaging position, progressively and successively raising and lowering the electrodes to welding position, and simultaneously lifting the plungers from the work.

2. An apparatus for progressively forming welds, comprising, in combination, a guide block, a stationary electrode constituting a work support below the guide block, a plurality of movable electrodes slidable in said guide block, a plurality of hold-down plungers positioned between the movable electrodes and also slidable in the block, a power driven shaft, cams on said shaft operating levers connected to said electrodes and plungers for simultaneously lowering said plungers and later simultaneously raising them and during the period the said plungers are lowered into pressure engagement with the work successively contacting the said several electrodes with the work, a transformer, and means for transferring the secondary current of the transformer from one movable electrode to another without interrupting the primary circuit in said transformer.

3. An apparatus for progressively forming welds, comprising, in combination, a guide block, a stationary electrode below the guide block, a plurality of alternately arranged movable electrodes and work engaging plungers slidable in said block, springs for normally maintaining said plungers and electrodes elevated, levers connected to said electrodes and plungers, a power driven cam shaft, cams spaced along said shaft and operatively related to the said levers for the movable electrodes and plungers to first move all of the plungers downwardly to clamp the work to the stationary electrode and progressively lower and raise said electrodes prior to lifting the plungers, a transformer, means for connecting the secondary of the transformer with the stationary electrode, means for connecting the secondary of the transformer with the movable electrodes, and switch means controlled by said shaft for maintaining the circuit closed at the primary of the transformer continuously while the movable electrodes are forming welds.

GROVER A. HUGHES.